United States Patent
Dopslaff et al.

(10) Patent No.: US 9,223,322 B2
(45) Date of Patent: Dec. 29, 2015

(54) METHOD FOR OPERATING A WATER SOFTENING SYSTEM COMPRISING TARGET VALUE CONTROL BY A WATER REMOVAL STATION

(75) Inventors: Carsten Dopslaff, Winnenden (DE);
Ralf Soecknick, Kornwestheim (DE)

(73) Assignee: JUDO Wasseraufbereitung GmbH, Winnenden (DE)

( * ) Notice: Subject to any disclaimer, the term of this patent is extended or adjusted under 35 U.S.C. 154(b) by 1137 days.

(21) Appl. No.: 13/254,344

(22) PCT Filed: Feb. 27, 2010

(86) PCT No.: PCT/EP2010/001236
§ 371 (c)(1),
(2), (4) Date: Oct. 6, 2011

(87) PCT Pub. No.: WO2010/099910
PCT Pub. Date: Sep. 10, 2010

(65) Prior Publication Data
US 2012/0024390 A1 Feb. 2, 2012

(30) Foreign Application Priority Data

Mar. 3, 2009 (DE) .......................... 10 2009 011 132

(51) Int. Cl.
*G05D 21/02* (2006.01)
*B01J 47/14* (2006.01)
(Continued)

(52) U.S. Cl.
CPC ................. *G05D 21/02* (2013.01); *B01J 47/14* (2013.01); *C02F 1/42* (2013.01); *C02F 5/00* (2013.01);
(Continued)

(58) Field of Classification Search
CPC .. C02F 2209/40; C02F 2209/055; C02F 1/42; C02F 5/00; C02F 2209/005; C02F 2301/043; B01J 47/14; G05D 21/02; G05D 11/138; G05D 11/139; Y10T 137/8593; Y10T 137/0318; Y10T 137/0335

USPC .............................. 137/2, 88, 93, 896, 897, 4
See application file for complete search history.

(56) References Cited

U.S. PATENT DOCUMENTS

| 3,807,425 A | 4/1974 | Boirum et al. |
| 4,556,484 A | 12/1985 | Hunter et al. |

(Continued)

FOREIGN PATENT DOCUMENTS

| DE | 28 30 263 A1 | 1/1979 |
| DE | 199 18 073 A1 | 10/2000 |

(Continued)

*Primary Examiner* — William McCalister
(74) *Attorney, Agent, or Firm* — Hackler Daghighian & Martino (57) ABSTRACT

A method for operating a water softening plant (1) having:
an automatically adjustable blending device (9a, 9a', 9a") for mixing a blended water flow $V(t)_{blended}$ comprising a first softened partial flow $V(t)_{part1soft}$ and a second partial flow $V(t)_{part2untreated}$ which carries untreated water, and having
an electronic control device (11),
the control device (11) controlling the adjustment position of the blending device (9a, 9a', 9a") by means of one or more experimentally determined current measurement variables in such a manner that the water hardness in the blended water flow $V(t)_{blended}$ is adjusted to a predetermined desired value (SW),
the blending device (9a, 9a', 9a") supplying one or more water removal stations (50, 50', 50") with blended water, is characterized in that
the desired value (SW) is predetermined by a setting of the one or more water removal stations (50, 50', 50"),
and in that the setting of the one or more water removal stations (50, 50', 50") is transmitted to the control device (11). With the present invention, it is possible to provide water having different levels of hardness at one or more connected water removal stations with a water softening plant in a convenient manner.

16 Claims, 4 Drawing Sheets

(51) Int. Cl.
  *C02F 1/42*  (2006.01)
  *C02F 5/00*  (2006.01)
  *G05D 11/13*  (2006.01)

(52) U.S. Cl.
  CPC ............ *G05D 11/138* (2013.01); *G05D 11/139* (2013.01); *C02F 2209/005* (2013.01); *C02F 2209/055* (2013.01); *C02F 2209/40* (2013.01); *C02F 2301/043* (2013.01); *Y10T 137/0318* (2015.04); *Y10T 137/0335* (2015.04); *Y10T 137/8593* (2015.04)

(56) References Cited

U.S. PATENT DOCUMENTS

| | | |
|---|---|---|
| 5,439,379 A | 8/1995 | Hansen |
| 5,774,529 A | 6/1998 | Johannsen et al. |
| 6,413,088 B1 | 7/2002 | Kawaguchi |
| 6,456,202 B2 | 9/2002 | Johannsen et al. |
| 6,457,589 B1 | 10/2002 | Poirier et al. |
| 6,474,988 B1 | 11/2002 | Georgakis et al. |
| 6,696,963 B2 | 2/2004 | Zimmerman et al. |
| 7,448,102 B2* | 11/2008 | Milligan et al. ............... 8/158 |
| 2005/0103717 A1* | 5/2005 | Jha et al. .................. 210/652 |
| 2005/0263457 A1* | 12/2005 | Wilkins et al. ............. 210/663 |
| 2005/0272006 A1 | 12/2005 | Rosenberg |
| 2006/0243647 A1* | 11/2006 | Mitsis ......................... 210/96.1 |
| 2007/0215531 A1* | 9/2007 | Wawrla et al. .............. 210/101 |
| 2008/0290009 A1 | 11/2008 | Koch |
| 2009/0134080 A1* | 5/2009 | Fabig ........................... 210/137 |
| 2010/0051519 A1* | 3/2010 | Maier-Witt et al. ........... 210/89 |
| 2010/0163489 A1* | 7/2010 | Bauder et al. ............... 210/652 |
| 2010/0301882 A1* | 12/2010 | Socknick et al. ............ 324/694 |

FOREIGN PATENT DOCUMENTS

| | | |
|---|---|---|
| DE | 199 40 162 A1 | 1/2001 |
| EP | 0 900 765 B1 | 3/2003 |
| EP | 2 196 885 A1 | 6/2010 |
| GB | 2 001 108 A | 1/1979 |
| WO | WO 2004/104306 A1 | 12/2004 |
| WO | WO 2008/142690 A2 | 11/2008 |

\* cited by examiner

METHOD FOR OPERATING A WATER SOFTENING SYSTEM COMPRISING TARGET VALUE CONTROL BY A WATER REMOVAL STATION

The invention relates to a method for operating a water softening plant having:
an automatically adjustable blending device for mixing a blended water flow $V(t)_{blended}$ comprising a first softened partial flow $V(t)_{part1soft}$ and a second partial flow $V(t)_{part2untreated}$ which carries untreated water, and having
an electronic control device,
the control device controlling the adjustment position of the blending device by means of one or more experimentally determined current measurement variables in such a manner that the water hardness in the blended water flow $V(t)_{blended}$ is adjusted to a predetermined desired value (SW),
the blending device supplying one or more water removal stations with blended water.

Such a method is known, for example, from EP 0 900 765 B1.

Water softening is used wherever only relatively hard water is available via the conventional supply systems (such as the drinking water mains supply), but where for technical reasons or for reasons of comfort a softer water is desired.

A water softening plant is generally installed centrally (for example, in the basement of a building) and supplies a plurality of water removal stations (in the simplest case comprising water taps, or also technical devices which consume water such as washing machines) with softened water.

For technical or economic reasons, it is often necessary or desirable to use only partially softened water. For instance, water which has been completely softened may lead to problems of corrosion if it is no longer possible to form a protective layer in the pipeline installation which is arranged downstream. In addition, in the case of complete softening, the capacity of a softener (mostly comprising an ion exchange resin) is rapidly exhausted, and it must be regenerated prematurely. This is linked with high salt consumption and consequently increased costs. In order to carry out a partial softening operation, a blending device for mixing softened water (also referred to as soft water) and untreated water is required. It is generally desirable to adjust and control the water hardness in blended water, that is to say, the mixture of softened water and untreated water.

EP 0 900 765 B1 describes a device for softening water in accordance with the ion-exchange principle using a blending device. An evaluation and adjustment unit automatically adjusts the hardness of a mixed water via the ratio of untreated water and soft water by means of a locking valve or a cross-section regulator. The hardness of the untreated water is established for this purpose via electric conductance.

In known water softening plants, the desired blended water hardness is input directly at the respective control device thereof and used as a desired value for controlling the blending device. The input of the desired blended water hardness is generally carried out prior to starting up the water softening plant. The water removal locations connected to the water softening plant all receive blended water of the same hardness. The desired value remains constant during operation of the water softening plant.

Depending on the application, however, it may be necessary or desirable to have changing levels of water hardness at the water removal stations. For example, for the preparation of cold drinks it may be desirable to have a mineral-rich water with a relatively high level of water hardness, whilst for operating a washing machine, in order to conserve washing agent, a relatively low level of water hardness is desirable.

The input of a new desired value at the control device is extremely complex, in particular since the water softening plant is mostly accommodated centrally at the entrance to a domestic installation (for example, in the basement of a building).

OBJECT OF THE INVENTION

An object of the present invention is to provide water with different levels of hardness at one or more connected water removal stations with a water softening plant in a convenient manner.

BRIEF DESCRIPTION OF THE INVENTION

This object is achieved with a method of the type mentioned in the introduction which is characterised in that the desired value (SW) is predetermined by a setting of the one or more water removal stations,
and in that the setting of the one or more water removal stations is transmitted to the control device.

According to the present invention, the desired value of the blended water hardness to which the control device of the water softening plant adjusts the blending device is not predetermined at the control device but instead at a water removal station. The water removal station comprises at least one removal fitting (for example, a tap) and is arranged remote from the water softening plant and connected thereto by means of a pipe system. The water softening plant is typically arranged at the entrance to a domestic or industrial installation and the water removal station is part of this domestic or industrial installation. In the scope of the invention, the water softening plant is typically separated from the water removal station(s) by means of building walls and/or ceilings.

The setting of the one or more water removal stations directly or indirectly contains information regarding a currently desired level of water hardness which is then used as a desired value of the control device at the blending device (it should be taken into account that there may also be provided a plurality of blending devices in the water softening plant according to the invention). The setting of the one or more water removal stations can be changed by means of an operator so that by means of the setting the operator can select a desired water hardness. The adjustment is then transmitted to the control device using suitable means (for example, via radio or a data line), evaluated and used to control the adjustment position of the blending device so that blended water of the desired hardness can be provided immediately at the water removal station(s).

Using the present invention, it is no longer necessary to use for every application water having the same hardness which is in practice fixedly predetermined. Depending on the application, it is possible to select different levels of water hardness which are desirable or necessary in an individual and convenient manner. For example, for some applications, it is possible to completely dispense with softening (for example, for watering a garden or flushing toilets). For drinking water, mineral-rich hard water or softened soft water may be desirable on an individual basis. Partially softened water is advantageous, for example, for showering. On the one hand, this reduces scale stains on fittings but, on the other hand, body care products can be readily rinsed away. Softened soft water may be advantageous for the preparation of tea or coffee, for watering specific plants, such as orchids, or for ironing.

Current measurement variables, by means of which the adjustment of the hardness of the blended water is carried out, may be, for example, the untreated water hardness or throughflows of untreated water or soft water at the blending device.

PREFERRED VARIANTS OF THE INVENTION

In a particularly advantageous variant of the method according to the invention, at least one water removal station has an input device at which the desired value (SW) is input. This variant allows an individual selection of the desired water hardness at the water removal station. The setting to be transmitted comprises in this variant the desired value input at the input device. The desired value does not need to be numerically input or transmitted directly but may also exist indirectly by selecting and communicating one option from a plurality of options (for example, soft-medium-hard) or the continuously adjustable position on a scale, only the control device needing to numerically associate the desired value with the option or scale position.

The input device may be, for example, a rotary switch or a keyboard or a slide with a scale. The water removal station then also comprises the input device in addition to the actual removal fitting (consumer location, such as a "water tap"). In the case of several water removal stations, in this configuration at least one of the water removal stations has an input device, by means of which the water hardness desired for this water removal station is predetermined.

In a preferred development of this variant, the desired value (SW) input at the water removal station by means of the input device is transmitted to the electronic control device of the water softening plant by means of radio data transmission or wired data transmission. It is thereby possible to transmit in a simple manner the information relating to the setting of the one or more water removal stations to the control device even over relatively large distances and through walls and ceilings. In particular, it is possible to use WLAN or RS232.

In a particularly preferred variant of the method according to the invention, there is provision for the blending device to supply a plurality of water removal stations with blended water, and for the desired value (SW) to be determined as a function of the water removal station from which blended water is currently removed. That is to say: the transmitted setting (in this case of the plurality of water removal stations) comprises in this variant the information regarding the water removal station from which water is currently removed. The water removal station from which blended water is currently removed determines the desired value. The drawing action of an operator or an automatically acting technical consumer can be evaluated directly without requiring further input operations in order to obtain the said information.

In a preferred development of this method variant, fixed desired values which are defined in the control device are assigned for at least some of the water removal stations. The desired value can then be determined exclusively by the fact that water is currently removed from a specific water removal station. No further input operations at all are required by an operator to predetermine the desired value; there are also no input devices required at the water removal stations in order to input a desired value. For the water removal stations (or water removal station groups) of this portion, there is configured in each case a removal sensor which registers water removal at the water removal station (for example, by means of a flow measurement, or by reading out the position of a tap) and passes this to the control device, for example, by means of radio transmission or wired connection. This variant is particularly advantageous if, in the event of various drawing actions at the same water removal station, the same level of water hardness is always required (perhaps because a specific technical device is permanently connected at that location), but the various water removal stations each require different levels of water hardness. For example, in a domestic installation, 2° water is always supplied to the kitchen pipe, 6° water always to the bath/shower, whilst the toilet cistern is filled with hard water. Each of these removal locations (water removal stations) typically has its own supply line from the blending device. However, "pipe groups" (water removal station groups) can also be formed, for example, toilet pipe for all toilets, shower pipe for all showers, etc. Water of the same hardness is always supplied to the respective pipe and a flushing operation prior to using the water is not necessary. The blending device is preferably easily and rapidly controlled simply by opening a removal location.

In another advantageous method variant, there is provision for the blending device to supply a plurality of water removal stations with blended water and, if water is removed from a plurality of water removal stations at the same time, for the desired value to be determined by the water removal station from which water first began to be removed. This procedure ensures that, during a current water removal operation, there is no change in the hardness level of the water removed. At water removal locations where water began to be removed later, and which therefore do not (yet) receive the required level of water hardness, a warning signal can be output.

In an alternative method variant which is also advantageous, there is provision for the blending device to supply a plurality of water removal stations with blended water and, when water is removed from a plurality of water removal stations at the same time, for the desired value to be determined by the water removal station which requests the lowest level of blended water hardness. This protects water consumers which tolerate only a low level of water hardness and which could be damaged by a level of water hardness which is too high. On the other hand, a low level of water hardness is generally well tolerated by technical water consumers which normally operate with a relatively high level of water hardness. Alternatively, other priorities of the water removal stations are also possible, such as the precedence of a specific water removal station regardless of the level of water hardness required there. According to the invention, it is also possible always to allow water removal at only one water removal station and to block the remaining ones until water removal is stopped at that location.

A particularly preferred method variant is characterised in that the blending device supplies a plurality of water removal stations with blended water and in that a division of the flow of blended water $V(t)_{blended}$ between the various water removal stations is carried out directly downstream of the confluence of the soft-water-carrying partial flow $V(t)_{part1soft}$ and untreated-water-carrying partial flow $V(t)_{part2untreated}$. In this case, the water hardness during the beginning time of water removal from a water removal station is dependent only on the level of water hardness last drawn at that location. In a particularly advantageous manner, in this variant only simultaneous drawing is allowed at one water removal station and a fixed desired value is assigned to the individual water removal stations. The desired level of water hardness is thereby also already provided at the individual water removal stations at the beginning of a water removal operation; flushing of pipes is not necessary.

Another method variant is advantageous according to which a display at a water removal station signals as soon as the water removed from that location has reached the predetermined desired value (SW). Water between the blending device and consumer location (water removal station) must generally first be flushed out at the start of water removal since the hardness thereof corresponds to a desired value which was previously set. The volume of water to be flushed out is dependent on the pipe volume between the blending device and consumer location. By flushing out prior to the actual removal operation, fresh non-stagnant water is available. The volume flushed out can be determined by means of a flow measuring device, volume counter or approximately by means of a timing member at the consumer location. The flow measuring device or the volume counter can be integrated at the consumer location, in particular in the water tap or in the supply line. Alternatively, the water hardness can also be checked experimentally in situ at the water removal station, for example, by means of an ion-selective electrode or by means of titrimetric determination. The display helps to prevent the use of water with a (still) undesirable level of hardness. The display can be constructed, for example, as a green control lamp, which is illuminated as soon as (after adequate flushing of the supply line) and for as long as the desired level of water hardness is provided. In particular, it is possible to use an optical display or an acoustic display.

Another method variant is advantageous according to which a signal transmitter at a water removal station outputs a warning signal as long as the water removed at that location has not yet reached the predetermined desired value (SW). The signal transmitter also helps to prevent the use of water with an undesirable level of hardness. The signal transmitter can be constructed, for example, as a red control lamp which is illuminated as long as the desired level of water hardness is not yet provided (that is to say, the supply line is not yet adequately flushed). It is possible to use in particular optical and acoustic signal transmitters.

In a preferred method variant, a display at a water removal station indicates which desired value (SW) is predetermined for this water removal station. This reduces the risk of inadvertently drawing an undesirable level of water hardness. The level of hardness that the water which is currently removed has can easily be verified.

In another preferred method variant, there is provision for the water softening plant to comprise at least two flow meters for directly or indirectly determining the current partial flows $V(t)_{part1soft}$ and $V(t)_{part2untreated}$ and for the blending device to be controlled in accordance with a measured current untreated water hardness $WH_{untreated}^{mom}$ and the predetermined desired value (SW) for the water hardness in the blended water flow $V(t)_{blended}$ with backward connection to the specific partial flows $V(t)_{part1soft}$ and $V(t)_{part2untreated}$. The adjustment of the blending is then particularly precise. It is possible to compensate for fluctuations of the proportions of the partial flows in the blended water which may arise owing to fluctuations in external conditions (such as the pressure of the incoming untreated water, or the size of the removal flow of blended water) when the blending device has an identical setting, and the blended water hardness remains particularly precisely at the desired value.

Another particularly preferred method variant is characterised in that at least one water removal station mixes a cold water supply flow and a warm water supply flow with proportions in accordance with a setting of a mixing device at the water removal station,
one of the supply flows, in particular the warm water supply flow, having a fixed water hardness and the other supply flow, in particular the cold water supply flow, being supplied with blended water via the blending device,
and in that the setting of the mixing device is transmitted to the control device and is evaluated in order to determine the desired value. Generally, a low hardness (typically <=2° dH, generally 0° dH) is provided for the warm water. By mixing both supply flows, the consumer receives mixed water of a medium temperature. By mixing both supply flows, a hardness is produced in the mixed water in accordance with the proportions of the supply flows and the respective water hardnesses thereof. For the mixed water, a mixed water hardness is either fixedly predetermined or predetermined by a setting of the water removal station. The control device establishes from the proportions of the supply flows and the predetermined mixed water hardness the desired value necessary to reach it for the cold water. With the method variant, the hardness of the mixed water can be adjusted.

Another method variant is preferred in which the water softening plant has a plurality of automatically adjustable blending devices whose adjustment positions are controlled by the control device. It is thereby possible to use the water softening plant in a more flexible and effective manner.

In a particularly preferred development of this method variant, there is provision for blended water discharge flows from a plurality of blending devices to be combined and for the combined blended water discharge flow to supply one or more water removal stations with blended water,
and for the control device, using the desired value (SW) which is predetermined by the setting of the one or more water removal station(s) at the combined blended water discharge flow, to select one of the associated blending devices for providing the blended water and to adjust it to the desired value (SW) and to block the remaining associated blending devices for providing blended water.

Each blending device may produce, for example, blended water whose water hardness is within a specific range (for example, one blending device may be responsible for blended water in the hardness range I, another for the hardness range II and a third for the hardness range III). Extreme and frequent changes to the settings of the individual blending devices are thus prevented and the material wear is reduced. Furthermore, the predetermined desired values (SW) are reached more rapidly if each individual blending device only operates within a limited hardness range. Typically, the various blending devices each cover different hardness ranges which are preferably consecutive.

In another particularly preferred development of the above method variant, there is provision for a plurality of blending devices each to exclusively supply one or more water removal stations with blended water,
for the electronic control device to control the adjustment positions of the blending devices which are exclusively providing a supply by means of one or more experimentally determined current measurement variables in such a manner that the water hardness in the flow of blended water of a respective blending device is adjusted to a respective desired value (SW),
and for the respective desired values (SW) of the blending devices which are exclusively providing a supply to each be predetermined by a setting of the one or more water removal stations which are connected to the respective blending device. This variant allows the simultaneous provision of blended water of a varying but individually and comfortably preselected hardness by the various blending devices.

The scope of the present invention also includes a water softening system
comprising a water softening plant having:
an automatically adjustable blending device for mixing a blended water flow $V(t)_{blended}$ comprising a first softened partial flow $V(t)_{part1soft}$ and a second partial flow $V(t)_{part2untreated}$ which carries untreated water, and having an electronic control device, the control device controlling the adjustment position of the blending device by means of one or more experimentally determined current measurement variables in such a manner that the water hardness in the flow of blended water $V(t)_{blended}$ is adjusted to a predetermined desired value (SW), and comprising one or more water removal stations which are connected, in order to be supplied with blended water by the blending device, to the water softening plant, which is characterised in that means for detecting a setting of the one or more water removal stations are provided, in that means for transmitting the detected setting to the electronic control device are provided, and in that the electronic control device is constructed to use a desired value which corresponds to the transmitted settings in the blending device. The water removal system can comfortably provide changing levels of water hardness to the water removal station(s) using a water softening plant without a manual adjustment being required at the control unit thereof for the purpose.

In a preferred embodiment of the water softening system according to the invention, there is provision for the means for detecting a setting to comprise an input device, in particular a rotary switch or a keyboard, and/or removal sensors, in particular flow meters or valve position measurement sensors, and/or the means for transmitting the detected setting to comprise a radio transmitter and a radio receiver or a data transmission cable. Those detection means and those transmission means are particularly simple and have been found to be advantageous in practice.

Another preferred embodiment is characterised in that the water softening plant has a plurality of blending devices each for supplying one or more water removal stations with blended water, and in that the electronic control device controls the adjustment positions of the blending devices by means of one or more experimentally determined current measurement variables so that the water hardness in a respective blended water flow $V(t)_{blended}$ is adjusted to a respective predetermined desired value (SW). The water softening plant can thereby be used more flexibly and effectively.

The scope of the present invention also includes the use of a water softening system according to the invention in an above-described method according to the invention.

Other advantages of the invention will be appreciated from the description and the drawings. The features mentioned above and those set out below can also be used according to the invention individually or together in any combination. The embodiments illustrated and described are not intended to be understood to be a conclusive listing but are instead of exemplary character in order to describe the invention.

DETAILED DESCRIPTION OF THE INVENTION AND DRAWINGS

Figure 1:
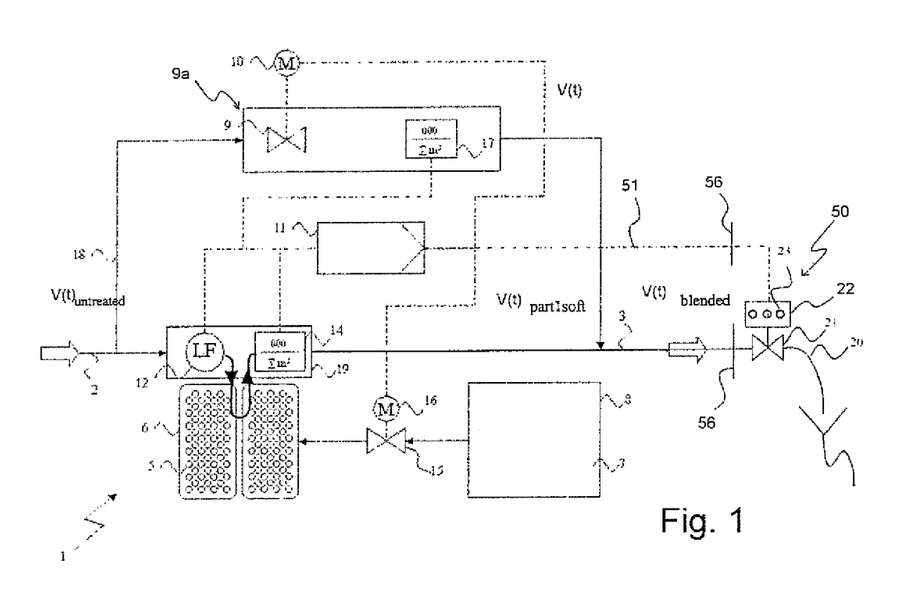
FIG. 1: is a schematic illustration of a water softening system according to the invention having an input device for the desired blended water hardness in a water removal station.

The invention is illustrated in the drawings and is explained in greater detail with reference to embodiments. In the drawings:

FIG. 1 is a schematic illustration of a water softening system according to the invention comprising a water softening plant 1 for use with an operating method according to the invention and (in this instance) a water removal station 50.

The water softening plant 1 is connected to a local water supply system, for example, the drinking water mains network, by means of a supply 2. To that end, the water softening plant is located in a supply room (for example, basement room) of a building which is intended to be supplied with water (in particular blended water and/or soft water) by means of the water softening plant.

A first portion of the (total) untreated water flow $V(t)_{untreated}$ which flows along the supply 2 flows to a softening device 6 which has in particular a control head 19 and two chambers with ion exchange resin 5. A second portion of the untreated water flows into a bypass line 18.

The untreated water flowing into the softening device 6 first passes a conductivity sensor 12, with which the current water hardness $WH_{untreated}^{mom}$ of the untreated water is established. Subsequently, that untreated water passes one of the two chambers or even both chambers with ion exchange resin 5, the water becoming completely softened. Finally, the softened water passes the flow meter 14 which establishes the current first partial flow $V(t)_{part1soft}^{mom}$.

The second portion of the untreated water in the bypass line 18 first passes an automatically actuatable blending device 9a, in this instance a blending valve 9 which can be adjusted with a servo-motor 10, and subsequently a flow meter 17 which establishes the current second partial flow $V(t)_{part2untreated}^{mom}$.

The first partial flow $V(t)_{part1soft}$ and the second partial flow $V(t)_{part2untreated}$ are finally combined to form a blended water flow $V(t)_{blended}$ which flows to a discharge line 3. The discharge line 3 is connected to the single water removal station 50 (in this instance). The water removal station 50 is located outside the supply room in which the water softening plant 1 (including the control device 11) is arranged which is indicated by partition walls 56. Therefore, the water softening plant 1 is not accessible to an operator of the water removal station 50. In general, the single water removal station 50 or the plurality of water removal stations 50 is/are typically at least 2m away from the water softening plant 1 (and particularly the control device 11 thereof) according to the invention.

The measurement results of the conductivity sensor 12 and the flow meters 14, 17 are communicated to an electronic control device 11. A desired value SW of the water hardness of the blended water that is intended to be available at the water removal station 50 is stored in the control device 11. From the desired value SW of the blended water hardness and the current water hardness $WH_{untreated}^{mom}$, the control device 11 establishes a current desired ratio of the partial flows $V(t)_{part1soft}$ and $V(t)_{part2untreated}$, by means of which the desired water hardness in the blended water is produced. If the current partial flows $V(t)_{part1soft}^{mom}$ and $V(t)_{part2untreated}^{mom}$ do not correspond to the desired ratio, the control device 11 automatically controls the adjustment position (in this instance the cross-section of flow) of the blending valve 9 by means of the servo-motor 10, for example, by means of a PD or PID control. The water softening plant 1 can thereby also provide a constant blended water hardness when the untreated water hardness varies or when line pressures vary.

Furthermore, the control device 11 also monitors the degree of exhaustion of the currently active chamber of the softening device 6. In the case of removal of water, the quantity of soft water removed is weighted with the associated current untreated water hardness and subtracted from the (current remaining) capacity. If the chamber is exhausted, the control device 11 switches the softening device 6 to the other (non-exhausted) chamber and further initiates regeneration of the exhausted chamber. To that end, a regeneration valve 15 having a servo-motor 16 is automatically actuated by the control device 11, whereby regeneration means solution 7 (preferably brine) flows out of a storage vessel 8 through the exhausted chamber.

The water removal station 50 comprises a consumption location (removal fitting) 20, for example, a tap, and further comprises a closure valve 21 which is opened or closed by means of an actuating member 22. An input device 23, here in the form of three selection keys by means of which a desired water hardness can be input, is located on the actuating member 22 of the removal fitting 20. The three keys stand, for example, for 2° dH, 6° dH and 18° dH which is printed thereon and which is intended, for example, for the uses ironing (2° dH), showering/bathing (6° dH) and preparation of cold drinks (18° dH).

If a new desired water hardness is input at the input device 23, this is transmitted as a new desired value SW to the control device 11 via a data transmission cable 51 (in this instance) and is subsequently used thereby for the blending device 9a.

In the embodiment, the selection keys of the input device 23 can be illuminated in a green and red colour, respectively. If a new selection key is pressed, at first it illuminates red. The operator is thereby informed that the relevant water hardness has been requested but is not yet available at the removal location 20. As soon as the line portion of the discharge line 3 as far as the water removal station 50 has been flushed with blended water of the new hardness requested, the illumination of the selection key changes to a green colour. The operator then knows that the desired hardness is now available. The green illumination is maintained in order to display the current water hardness until another selection key has been pressed.

Figure 2:
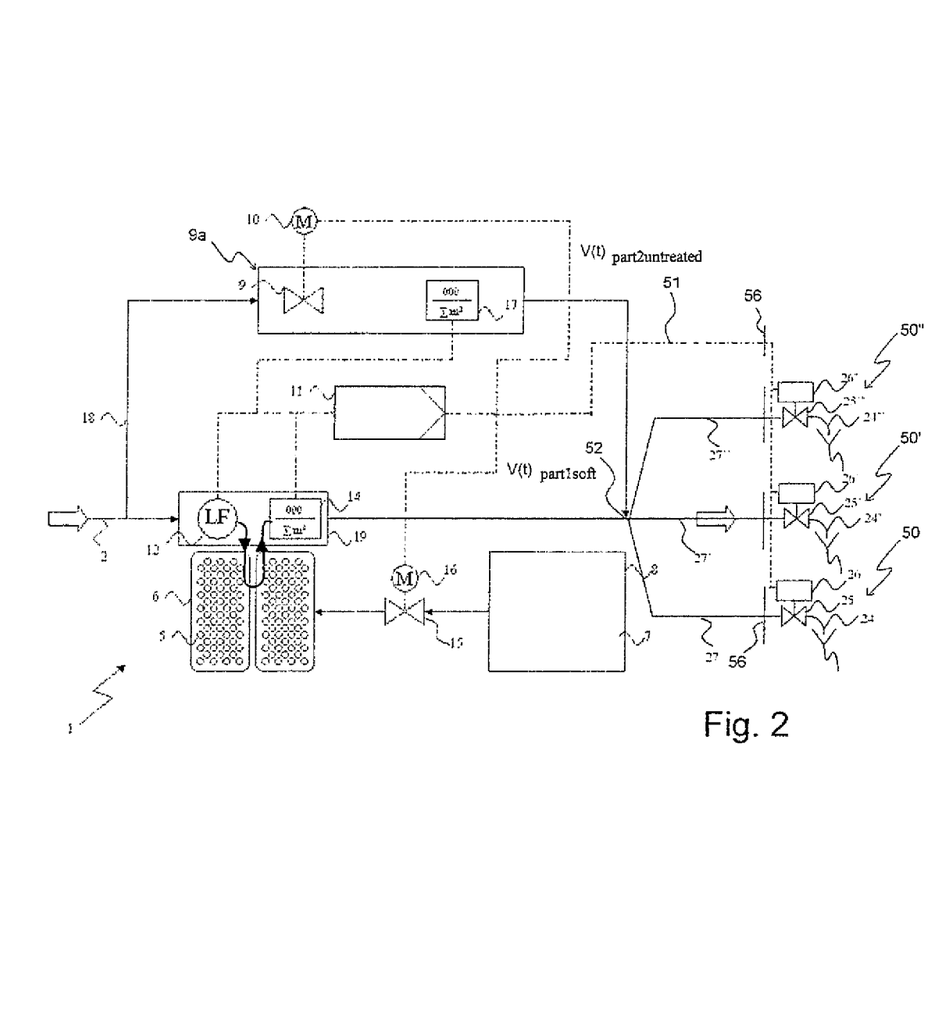
FIG. 2: is a schematic illustration of a water softening system according to the invention having a plurality of water removal stations for various blended water hardnesses.

FIG. 2 shows a water softening system similar to that of FIG. 1; only the differences are explained below (this also applies accordingly to the subsequent Figures).

In this embodiment, there are provided three water removal stations 50, 50', 50" which are supplied with blended water by a common blending device 9a.

Each removal fitting 24, 24', 24" of the water removal stations 50, 50', 50" supplies blended water having an individual water hardness which is predefined in the control device (and which can be changed directly only at the control device in this embodiment). All the removal fittings 24, 24', 24" are supplied from the blending device 9a by means of separate supply lines 27, 27', 27"; the supply lines 27, 27', 27" branch directly downstream of the confluence point 52 of the partial flows $V(t)_{part1soft}$ and $V(t)_{part2untreated}$.

Since the water hardness in the individual supply lines 27, 27', 27" does not change, it is not necessary to flush blended water having a different hardness out of the supply lines 27, 27', 27" before the water is used. For example, a supply line (for example, the lowest supply line 27) which leads to the kitchen may always contain water at 2°, another supply line (for example, the middle supply line 27') which leads to the bath/shower is filled with water at 6° whilst a third supply line (for example, the top supply line 27") which supplies a toilet cistern carries relatively hard water.

The blending device 9a is controlled by means of the control device 11 simply by opening a closure valve 25, 25', 25" by means of an actuating member 26, 26', 26" at the removal fitting 24, 24', 24"; a specific closure valve being opened is communicated to the control device 11 via the data transmission cable 51 therefor. If, for example, the shower is actuated (via the closure valve 25'), the blending device 9a is automatically adjusted so that the blended water hardness is 6° dH. It is also possible to form "line groups" (for example, toilet line for all toilets, shower line for all showers, etc.) so that each discharge line 27, 27', 27" supplies a plurality of water removal stations. In this embodiment, the actuating members 26, 26', 26" are configured in such a manner that it is possible to open a closure valve 25, 25', 25" only if all the other closure valves 25, 25', 25" are closed.

Figure 3:
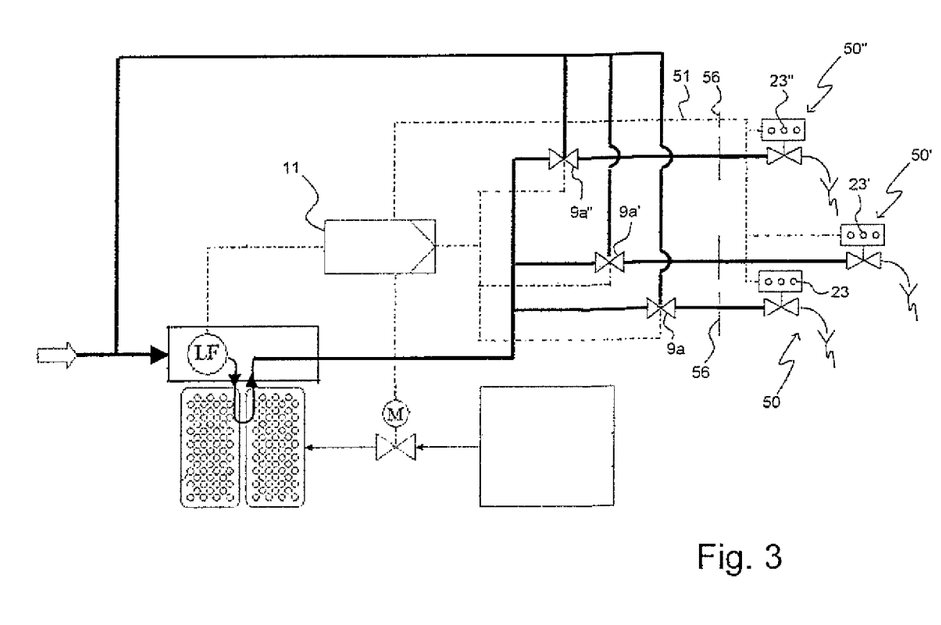
FIG. 3: is a schematic illustration of a water softening system according to the invention having a plurality of blending devices which each supply an individual water removal location with blended water.

FIG. 3 shows another embodiment of a water softening system according to the invention. The electronic control device 11 controls three simple blending devices 9a, 9a', 9a" which each supply (in this instance) precisely one water removal station 50, 50', 50" with blended water. Each water removal station 50, 50', 50" has an individual input device 23, 23', 23" for providing a desired value of the water hardness for the associated blending device 9a, 9a', 9a". In that embodiment, it is possible to supply a plurality of water removal stations 50, 50', 50" (or series of water removal stations) independently of each other with blended water having different hardnesses.

Figure 4:
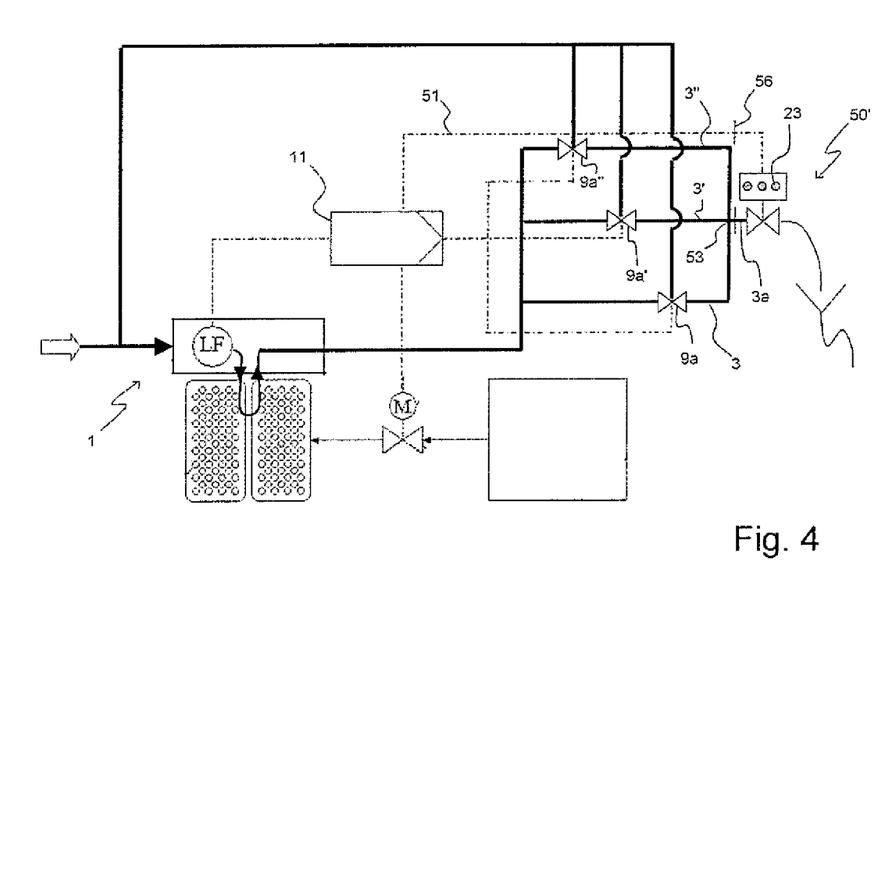
FIG. 4: is a schematic illustration of a water softening system according to the invention having a plurality of blending devices which together supply a water removal location with blended water.

The water softening system which is illustrated in FIG. 4 has a plurality of blending devices 9a, 9a', 9a" which together supply a water removal station 50 (or a series of water removal stations) with blended water. Discharge lines 3, 3', 3" of the blending devices 9a, 9a', 9a" converge at a confluence point 53, starting from which the water removal station 50 is connected via a combined blended water discharge line 3a.

Each blending device 9a, 9a', 9a" of the water softening plant 1 is responsible for a specific hardness range. For example, the lowest blending device 9a is responsible for a hardness range of from 0 to 4° dH, the middle blending device 9a' is responsible for a hardness range of from 5 to 10° dH and the top blending device 9a" is responsible for a hardness range of 11° dH and above. In accordance with the water hardness requested, input at an input device 23 of the water removal station 50 and transmitted via the data transmission cable 51 to the control device 11, the control device 11 selects the responsible blending device 9a, 9a', 9a" and controls it to the predetermined desired value; the water flow is completely blocked at the remaining blending devices 9a, 9a', 9a".

As a result, extreme and frequent adjustment changes of the individual blending devices 9a, 9a', 9a" are avoided; material wear is reduced. Furthermore, the predetermined desired values (SW) are reached more quickly if each individual blending device 9a, 9a', 9a" operates only within a limited hardness range.

The invention claimed is:

1. A method for operating a water softening plant comprising the steps of:
   providing an automatically adjustable blending device for mixing a blended water flow $V(t)_{blended}$ comprising a first softened partial flow $V(t)_{part1soft}$ and a second partial flow $V(t)_{part2untreated}$ which carries untreated water, the blending device having an electronic control device;
   the control device controlling the adjustment position of the blending device by means of one or more experimentally determined current measurement variables in such a manner that the water hardness in the blended water flow $V(t)_{blended}$ is adjusted to a predetermined desired value (SW);

the blending device supplying a plurality of water removal stations with blended water;

transmitting a setting for each of the plurality of water removal stations, including information from which water removal station of said plurality of water removal stations blended water is currently removed, to the control device; and predetermining the desired value (SW) by the setting for each of the plurality of water removal stations, wherein the desired value (SW) is determined as a function of the water removal station of said plurality of water removal stations from which blended water is currently removed, with the information about the water removal station from which blended water is currently removed determining the desired value (SW), wherein a different desired value (SW) is determined for the blending device when water is currently removed at a different water removal station of said plurality of water removal stations.

2. The method according to claim 1, wherein at least one water removal station has an input device at which the desired value (SW) for this water removal station is input.

3. The method according to claim 2, wherein the desired value (SW) input at the water removal station by means of the input device is transmitted to the electronic control device of the water softening plant by means of radio data transmission or wired data transmission.

4. The method according to claim 1, wherein fixed desired values which are defined in the control device are assigned for at least some of the water removal stations.

5. The method according to claim 1, wherein water is removed from several of the plurality of water removal stations at the same time, and the desired value is determined by the water removal station from which water first began to be removed.

6. The method according to claim 1, wherein water is removed from several of the plurality of water removal stations at the same time, and the desired value is determined by the water removal station which requests the lowest level of blended water hardness.

7. The method according to claim 1, wherein a division of the flow of blended water $V(t)_{blended}$ between the various water removal stations is carried out directly downstream of the confluence of the soft-water-carrying partial flow $V(t)_{part1soft}$ and untreated-water-carrying partial flow $V(t)_{part2untreated}$.

8. The method according to claim 1, wherein a display at one of the plurality of water removal stations signals as soon as the water removed from that location has reached the predetermined desired value (SW).

9. The method according to claim 1, wherein a signal transmitter at one of the plurality of water removal stations outputs a warning signal as long as the water removed at that location has not yet reached the predetermined desired value (SW).

10. The method according to claim 1, wherein a display at one of the plurality of water removal stations indicates which desired value (SW) is predetermined for this water removal station.

11. The method according to claim 1, wherein the water softening plant comprises at least two flow meters for directly or indirectly determining the current partial flows $V(t)_{part1soft}$ and $V(t)_{part2untreated}$, and wherein the blending device is controlled in accordance with a measured current untreated water hardness $WH_{untreated}^{mom}$ and the predetermined desired value (SW) for the water hardness in the blended water flow $V(t)_{blended}$ in feedback with the specific partial flows $V(t)_{part1soft}$ and $V(t)_{part2untreated}$.

12. The method according to claim 1, wherein at least one water removal station mixes a cold water supply flow and a warm water supply flow with proportions in accordance with a setting of a mixing device at the water removal station, one of the supply flows, in particular the warm water supply flow, having a fixed water hardness and the other supply flow, in particular the cold water supply flow, being supplied with blended water via the blending device, and in that the setting of the mixing device is transmitted to the control device and is evaluated in order to determine the desired value.

13. A water softening system, comprising:
a water softening plant comprising:
an automatically adjustable blending device for mixing a blended water flow $V(t)_{blended}$ comprising a first softened partial flow $V(t)_{part1soft}$ and a second partial flow $V(t)_{part2untreated}$ which carries untreated water;
an electronic control device, the control device controlling the adjustment position of the blending device by means of one or more experimentally determined current measurement variables in such a manner that the water hardness in the flow of blended water $V(t)_{blended}$ is adjusted to a predetermined desired value (SW); and
a plurality of water removal stations which are connected, in order to be supplied with blended water by the blending device, to the blending device;
wherein means for detecting a setting for each of the plurality of water removal stations are provided, wherein the setting for each of the plurality of water removal stations comprises the information from which water removal station of said plurality of water removal stations water is currently removed, wherein means for transmitting the detected setting of each of the plurality of water removal stations to the electronic control device are provided, and wherein the electronic control device is constructed to use a desired value in the blending device which corresponds to the transmitted settings of each of the plurality of water removal stations, wherein the desired value (SW) for each of the plurality of water removal stations is determined as a function of the water removal station of said plurality of water removal stations from which blended water is currently removed, with the information about the water removal station from which blended water is currently removed determining the desired value (SW), wherein a different desired value (SW) is determined for the blending device when water is currently removed at a different water removal station of said plurality of water removal stations.

14. The water softening system according to claim 13, wherein the means for detecting a setting comprise an input device, in particular a rotary switch or a keyboard, and/or removal sensors, in particular flow meters or valve position measurement sensors, and/or in that the means for transmitting the detected setting comprise a radio transmitter and a radio receiver or a data transmission cable.

15. The water softening system according to claim 13 using the method according to claim 1.

16. A method for operating a water softening plant comprising the steps of:
providing the water softening plant that conditions a raw water flow into a softened partial flow;

providing an untreated partial flow from the raw water flow;

providing an automatically adjustable blending device controlled by an electronic control device, where the blending device mixes the softened partial flow and the untreated partial flow resulting in a blended water flow;

providing the blended water flow to a plurality of water removal stations, where each of the plurality of water removal stations have their own desired water hardness level;

inputting or transmitting each of the desired water hardness levels to the control device;

transmitting an information to the control device about at which water removal station water is currently removed;

adjusting the amount of the softened partial flow in relation to the untreated partial flow by the blending device to produce the blended water flow with a water hardness that matches the desired water hardness level of the water removal station at which water is currently removed;

wherein at least two different water removal stations from the plurality of water removal stations have a different desired water hardness level.

* * * * *